July 31, 1962 H. O. SCHJOLIN 3,047,104
VEHICLE ENGINE AND BRAKE COOLING SYSTEM
Filed Nov. 28, 1958 2 Sheets-Sheet 1

INVENTOR.
Hans O. Schjolin
BY
D.C. Staley
His Attorney

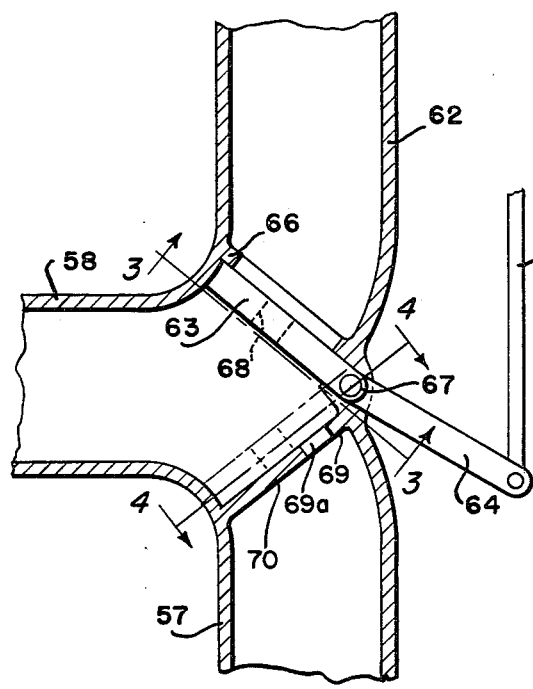
Fig. 2
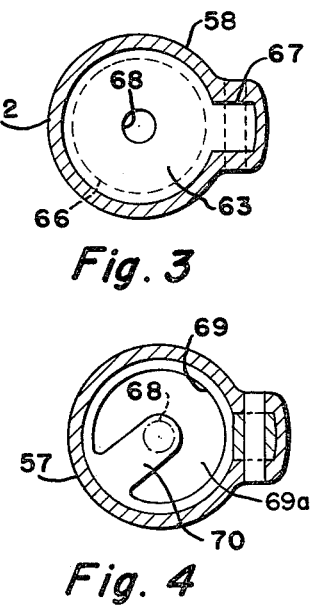
Fig. 3
Fig. 4
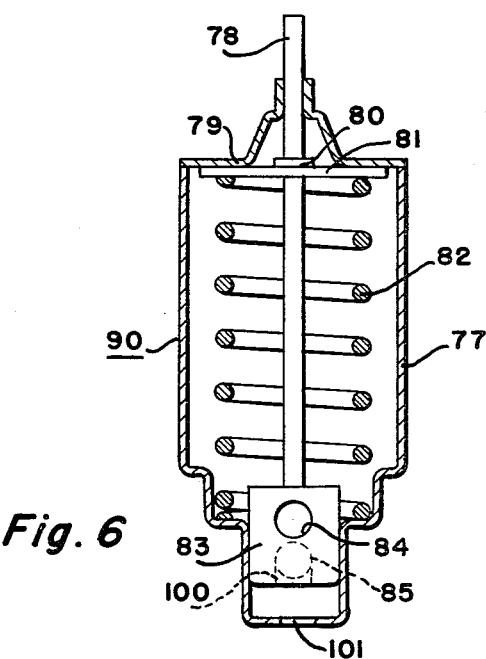
Fig. 6
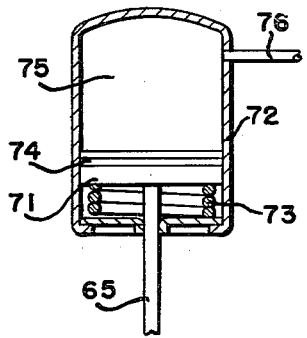
Fig. 5
INVENTOR.
Hans O. Schjolin United States Patent Office 3,047,104
Patented July 31, 1962

3,047,104
VEHICLE ENGINE AND BRAKE
COOLING SYSTEM
Hans O. Schjolin, Birmingham, Mich., assignor to General Motors Corporation, Detroit, Mich., a corporation of Delaware
Filed Nov. 28, 1958, Ser. No. 776,896
2 Claims. (Cl. 188—264)

This invention relates to a cooling system for a vehicle brake and more particularly to a fluid cooling system controlled in response to brake actuation.

Greater capacity for brake cooling is being required on motor vehicles, and particularly on cargo-carrying vehicles. The motor of a motor vehicle generally employs a fluid cooling system and a radiator for dissipating heat from the motor. The radiator for the motor in the vehicle can be adapted for use with the cooling of the vehicle brake. When the vehicle brakes are actuated, the cooling fluid is not required to the same extent as when the motor is under full load. For this reason, a combination fluid cooling system for the motor and the brakes of the vehicle adapts itself quite readily.

The conduit means connecting the vehicle brake to the cooling system and provided with automatic control means operating in response to the brake actuation can be adapted to employ the same radiator for the motor vehicle and the vehicle brakes. Accordingly, this invention is intended to provide a means for performing this function.

It is an object of this invention to provide a common fluid cooling system for the vehicle brakes and the motor of a vehicle.

It is another object of this invention to provide automatic control means responsive to brake actuation for directing through the vehicle brakes the greater portion of the cooling fluid which is normally passed through the vehicle engine.

It is a further object of this invention to provide a combination fluid cooling circuit for the vehicle engine and the vehicle brakes employing the same heat exchanger with an automatic control for directing the greater portion of the cooling fluid through the vehicle brakes when the vehicle brakes are actuated.

The objects of this invention are accomplished by means of a fluid cooled and fluid actuated vehicle disk brake. Passage means are provided within the braking structure for actuating the brakes as well as circulating cooling fluid through the vehicle disk brakes. Actuating fluid conduit means are connected to the vehicle brake structure through a treadle control valve to a source of pressurized fluid. The source of pressurized fluid is also in communication with an accumulator to maintain a constant pressure.

Means are also provided connecting the cooling fluid passages of the brake structure with external conduits leading to a heat exchanger. The heat exchanger is used for cooling of the brake cooling fluid as well as the engine cooling fluid which are all combined in the same circuit.

A fluid pump is employed within the cooling system and an automatic control means having valve means operating in response to the brake fluid actuating pressure is also included in the fluid circuit. The pressure from the actuating fluid operates a valve to direct the greater portion of the cooling fluid through the vehicle brakes when the brakes are actuated. A resilient means is also provided to direct the fluid through the vehicle engine when the vehicle brakes are not actuated.

Further objects and advantages of the present invention will be apparent from the following description, reference being had to the accompanying drawings wherein preferred embodiments of the present invention are clearly shown.

In the drawings:

FIGURE 2 is a cross-section view of the control valve of the fluid cooling system.

FIGURE 3 is a cross-section view taken on line 3—3 of FIGURE 2.

FIGURE 4 is a cross-section view taken on line 4—4 of FIGURE 2.

FIGURE 5 is a cross-section view taken on line 5—5 of FIGURE 1.

FIGURE 6 is a cross-section view taken on line 6—6 of FIGURE 1 and showing the treadle valve.

Figure 1:
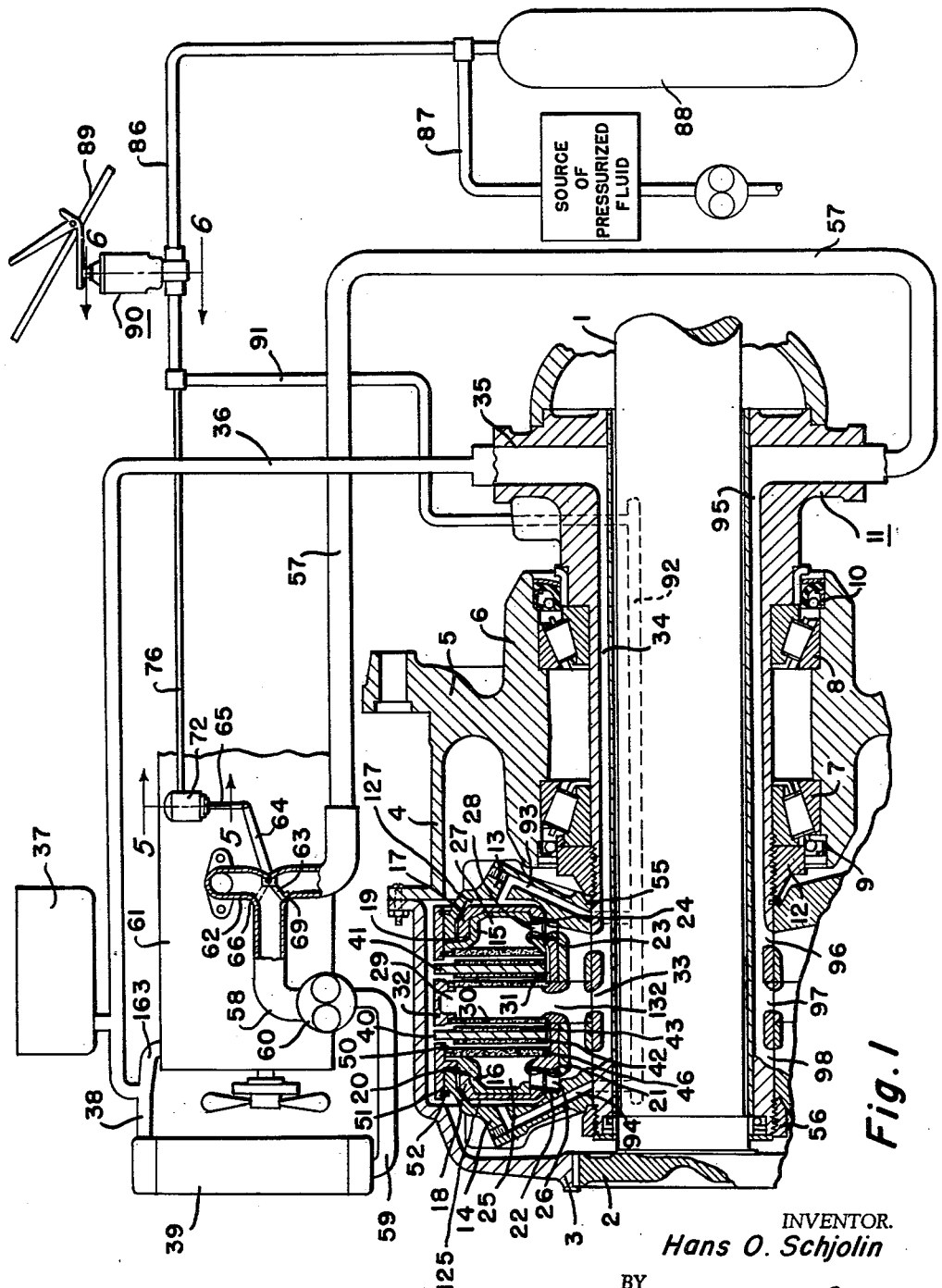
FIGURE 1 is a cross-section view of the vehicle brake structure with a schematic diagram of the fluid cooling and fluid actuating systems.

The figures illustrating this invention show a schematic diagram with a control means and the cross section of the general braking structure with which this cooling system is intended to be operated. A copending application of the same assignee, Serial Number 777,052, filed November 28, 1958, now Patent No. 2,955,678, issued September 11, 1960, may be referred to, to more clearly illustrate the braking structure of the vehicle disk brake.

The cross-section view of the braking structure is generally shown in FIGURE 1. The drive shaft 1 is shown extending to the outboard side of the braking structure with an enlarged annular spline portion 2. The spline portion 2 is connected to the housing 3 which encloses the outboard side of the braking structure. The housing 3 is connected to the brake housing portion 4 of the wheel hub 5. The wheel hub 5 is integral with a bearing housing portion 6. The bearing housing encloses the bearing assemblies 7 and 8. The bearings 7 and 8 are provided with grease seals 9 and 10 respectively. The bearing assemblies 7 and 8 are mounted on the outer periphery on the shaft housing 11 and are maintained in position by an adjusting nut 12 which threadedly engages the outer periphery shaft housing 11.

The braking structure is mounted on the outboard end and the outer periphery of the shaft housing 11. The braking structure includes an inboard wheel cylinder 13 and an outboard wheel cylinder 14 which operate in cooperation with the hydraulic pistons 15 and 16 respectively. The hydraulic wheel cylinders operate in conjunction with a diaphragm sealing means which is held in position by seal retainers 17 and 18. The seals 19 and 20 are mounted on the outer periphery of the hydraulic wheel pistons and the inner periphery of the hydraulic wheel cylinders. Similar seal means are provided on the inner periphery of the seal retainers 17 and 18 and the pistons 15 and 16 to provide a conduit means on the inner periphery of the braking structure. These seals are indicated at 21 and 22 on the outboard wheel cylinder and piston, and seals 23 and 24 on the inboard cylinder and piston. A fluid cooling chamber 25 is provided within the outboard wheel piston 18 for the cooling fluid as it is circulated from the inner periphery of the braking structure through the passage 26. An annular cooling chamber 27 is also provided on the inboard wheel cylinder and connected by the passage means 28 to the inner periphery of the braking structure.

A third cooling chamber 29 is also provided between the intermediate braking disk within the braking structure. The intermediate disks 30 and 31 are connected to an annular member 32 and remain stationary with the shaft housing 11. The chamber 29 is also in communication with passage 132 and the inner periphery of the braking structure. The inner periphery of the braking structure includes the passage means 33 adjoining an axially extended passage 34 which extends to the inboard side of the shaft housing 11. Outlet port 35 is connected to a conduit means 36 which, in turn, is connected to a reservoir 37 or a conduit 38. The conduit 38 is in communication with the vehicle engine cooling radiator 39.

The braking structure includes rotating disks 40 and 41 which are directly connected to a brake housing which rotates with the wheel hub 5. The rotating disk 40 is provided with friction material 42 and 43. The friction material 42 engages the stator brake disk 46, which is held in position by a snap ring 50 mounted on the inner periphery of the annulus 51. An additional snap ring 52 is also provided on the inner periphery of the annulus 51 to maintain the outboard wheel cylinder 14 in position. The same general structure is employed on the inboard side of the inboard hydraulic wheel cylinder and braking disks.

The braking structure is held in position on its inner periphery by the snap ring 55 on the inboard side and a locking nut 56 on the outboard side which threadedly engages the outer periphery of the outboard end of the shaft housing 11.

The braking structure is connected by return conduit means 57 which is in communication with the fluid cooling conduit means 58. The conduit means 58 is in communication with conduit means 59 which connects the fluid cooling pump 60 and the radiator 39. The vehicle engine 61 is provided with conduit 163 connected to conduit 38 and conduit 62 connected to conduit 58 to provide a cooling system for the engine.

Conduit means 57 leads to the vehicle brake and the conduit means 62 leads to the vehicle engine. Enclosed in the adjoining portion of these two conduits is a butterfly valve 63 which is operated by a lever 64. The lever 64 and the operating rod 65 are more clearly shown in FIGURE 2. The conduit 62 is provided with a valve seat 66 about its inner periphery adjacent to the hinged valve member 63. The valve member 63 has an annular portion fitting the valve seat 66 to close the conduit 62 on its outer periphery.

FIGURE 3 is a cross-section view taken on line 3—3 of FIGURE 2 and illustrates the shape of the valve 63 which is hinged at a point 67. The annular portion fits similarly on a seat 66 blocking the conduit on the outer portion. It is noted that the valve 63 is provided with a hole 68 at its central portion to provide limited circulation of cooling fluid through the vehicle engine. The size of this hole determines the desired proportion of cooling fluid to be circulated through the engine at the time the vehicle brakes are being cooled.

The valve 63 is integral with the lever arm 64 which pivots the valve 63 between the two positions. The conduit 57 is also provided with an annular valve seat 69 on the inner periphery of the conduit 57 which defines the conduit opening 69a. It will be noted that the hole 68 is also provided with a valve seat 70 extending radially inward from seat 69 into opening 69a to close the opening 68 when the valve member 63 is in the lower position. The valve seats 69 and 70 completely close off passage of any fluid through the conduit 57 when the vehicle brakes are inactive.

FIGURE 5 illustrates the piston 71 mounted within the cylinder 72 and biased to the upward portion by means of a spring 73. The piston 71 is provided with a seal means 74 on its outer periphery for sealing the outer periphery of piston 71 with the inner periphery of the walls of the cylinder 72. The rod 65 is shown extending from the lower portion of the cylinder 72. The chamber 75 is in communication with the actuating fluid for the vehicle disk brake through conduit 76 when the vehicle brakes are actuated.

A treadle valve is shown in FIGURE 6 with a cylindrical portion 77 enclosing the treadle valve mechanism. The mechanism includes a push rod 78 extending upwardly and out of the cylinder 77. The push rod 78 extends through the cover 79 on the upward end of the cylinder 77. The push rod 78 is provided with a snap ring 80 for maintaining a fixed position for the disk 81, the disk 81 being biased to the upward portion by means of a spring 82. Spring 82 is seated on the lower portion of the cylinder 77. The valve is indicated by numeral 83 in the lower portion of the cylinder 77. A hole 84 is shown in its relative position to the conduit opening 85 in the conduit means 86. As the treadle valve is actuated, the push rod 78 moves downwardly aligning hole 84 with the conduit opening 85 of conduit 86.

A conduit means 86 is connected to a conduit 87 which is in communication with a source of pressurized fluid, not shown. An accumulator 88 is also in communication with conduit means 87 and 86 to maintain a more constant actuating pressure.

This cooling system operates in the following manner: As the treadle 89 of the treadle valve 90 is depressed, the valve member 83 opens the conduit means 86 to permit pressurized fluid such as air from the accumulator 88 to pass through the conduit means 76 and 91. The conduit means 91 is in direct communication with the passage 92 within the shaft housing 11. Passage 92 being in communication with the passages 93 and 94 permits the fluid to enter the chambers 127 and 125 respectively. The pressurized fluid in these chambers actuates the vehicle disk brakes.

The pressurized fluid in conduit 76 enters the chamber 75 of the actuating cylinder 72. The pressurized fluid within chamber 75 then follows the piston 71 downwardly against the coil spring 73. This, in turn, moves the push rod 65 downwardly pivoting the lever 64 which is integral with the valve 63.

Valve 63 is contained within the conduits 57 and 62 where they adjoin conduit means 58. The valve 63 is normally held in the lower position whereby the hole 68 is closed by means of the valve seat 70 and the outer periphery of the valve member 63 is closed by means of the seat 69 on the inner periphery of the conduit 57. As the push rod 65 moves downwardly, the valve 63 pivots upwardly until the outer periphery of the valve member 63 seats itself firmly against the seat 66 within the inner periphery of the conduit 62. This contact seats the outer periphery of the valve member 63 and permits a limited passage of cooling fluid through the hole 68 to the vehicle engine. The greater portion of the fluid cooling system is then permitted to pass through the conduit 57 to the braking structure.

The fluid cooling circuit includes a vehicle engine radiator 39 which is in communication with the passage 59 which connects the inlet port of the fluid cooling pump 60. The conduit means 58 connects the outlet port of the fluid pump 60 to the conduit means 62 which enters the passage means within the vehicle engine. The fluid then passes through the engine and is expelled through conduit means 163 which is in communication with conduit means 38 of the vehicle radiator 39. This provides a connecting fluid cooling circuit for the vehicle engine 61.

The fluid cooling pump 60 provides a pressure means for circulating the cooling fluid through the vehicle engine and the vehicle brakes.

When the valve 63 is in the upper position as the vehicle brakes are actuated, the limited portion of the cooling fluid passes through the vehicle engine and the greater portion of the cooling fluid passes through the conduit 57 to the vehicle brakes. The conduit means 57 are in connection with the passage means 95 within the brake shaft housing 11. The axial conduit means 95 is in communication with radial passage means 96, 97 and 98. The fluid is then circulated through the cooling chamber 27, 29 and 25 and returns through the radial passages 26, 132 and 28. Cooling chambers 25, 27 and 29 extend for approximately 120° in the brake and are in communication with passages 26, 132 and 28.

The passages 26, 132 and 28 are in communication with the axial passage 34 which is connected to the outlet 35 and conduit 36. The conduit 36 is in communication with the conduit 38 on the inlet side of the vehicle radiator 39. So long as the vehicle brakes are actuated, the cooling fluid passes through the vehicle brakes and so provides the cooling of the braking system.

As the vehicle brakes are released, the treadle 89 moves upwardly and the push rod 78 is biased to an upward position by means of a spring 82, and the pressurized fluid within the conduit means 91 and 76 is released through the treadle valve openings 100 and 101 which discharge to the atmosphere. The spring 73 moves the push rod 65 upwardly carrying the lever 64 and thereby seating a valve member 63 in its lower position on the seats 69 and 70. This action closes the valve means 63 and permits circulation of the cooling fluid through the engine only. The cooling fluid circulates through the engine only, so long as the vehicle brakes are inactivated.

This device provides for circulation of the cooling fluid through the vehicle engine solely when the brakes are inactivated. When the brakes are activated, a limited portion of the cooling fluid continues to pass through the vehicle engine to provide a cooling means and the greater portion of the cooling fluid passes through the vehicle brakes to thereby provide cooling of the vehicle disk brake.

While the embodiment of the present invention as herein disclosed constitutes a preferred form, it is to be understood that other forms might be adopted.

What is claimed is as follows:

1. In a device of the character described comprising in combination, a vehicle brake including, actuating fluid passage means within said vehicle brake, a source of pressurization fluid, a cooling fluid valve control means including, an expansible chamber, a pressure responsive member in said valve control means, actuating fluid conduit means connecting said source of pressurizing fluid with said actuating fluid passage means in said vehicle brake and said expansible chamber in said cooling fluid valve control means, an actuating valve in said actuating fluid conduit means controlling the flow of pressurized fluid to actuate said vehicle brakes and to said expansible chamber in said cooling fluid valve control means, an engine cooling fluid system comprising a motor vehicle engine, cooling fluid passage means in said engine, a heat exchanger, cooling fluid conduit means connecting said cooling fluid passage means in said engine with said heat exchanger, means for circulating fluid through said engine cooling fluid system, cooling fluid passage means in said vehicle brake cooling fluid conduit means connecting said engine cooling fluid system with said cooling fluid passage means in said vehicle brake, a cooling fluid control valve in said cooling fluid conduit means connecting said cooling fluid passage means in said vehicle brake with said engine cooling fluid system for controlling the flow of cooling fluid through said engine cooling fluid system and said cooling fluid passage in said vehicle brake, said cooling fluid control valve including a first valve seat, a second valve seat, a valve element pivotably mounted for selectively engaging said valve seats, opening means in said valve element permitting limited flow of cooling fluid through engine cooling fluid system when fluid is circulated through said vehicle brake, means connecting said valve element with said pressure responsive member in said expansible chamber, said cooling fluid control valve directing flow of cooling fluid through said vehicle engine when said vehicle brakes are not in actuation and diverting a greater portion of the cooling fluid through said vehicle brake in response to pressurization of actuating fluid in said expansible chamber of said cooling fluid control means when said vehicle brake is actuated.

2. In a device of the character described comprising in combination, a vehicle brake including, actuating fluid passage means within said vehicle brake, a source of pressurized fluid, a cooling fluid valve control means, an expansible chamber in said cooling fluid valve control means, a pressure responsive member in said expansible chamber, actuating fluid conduit means connecting said source of pressurized fluid with said actuating fluid passage means in said vehicle brake and said expansible chamber in said cooling fluid valve control means, an engine cooling fluid system including an engine, cooling fluid passage means in said engine, a heat exchanger, cooling fluid conduit means connecting said passage means in said engine with said heat exchanger, cooling fluid passage means in said vehicle brake, connecting cooling fluid conduit means connecting said engine cooling fluid system with said cooling fluid passage means in said vehicle brake, a cooling fluid control valve in said connecting passage means for controlling the flow of cooling fluid through said engine cooling fluid passage means and said cooling fluid passages in said vehicle brake, said cooling fluid valve including, a valve element connected to said pressure responsive member in said cooling fluid valve control means, a first valve seat in said engine cooling fluid passage means, a second valve seat in said connecting passage means, an opening in said valve element permitting limited flow of cooling fluid through said engine cooling fluid system when cooling fluid is circulated through said cooling fluid passage in said vehicle brake when said brake is engaged, a portion of said second valve seat closing said opening in said valve element when said valve element engages the second valve seat to provide circulation of all the cooling fluid through said engine cooling fluid system when said brake is disengaged.

References Cited in the file of this patent

UNITED STATES PATENTS

| 903,068 | Enrico | Nov. 3, 1908 |
| 960,355 | Levin | June 7, 1910 |
| 1,972,353 | North et al. | Sept. 4, 1934 |
| 2,127,557 | Ells | Aug. 23, 1938 |
| 2,351,180 | Ash | June 13, 1944 |
| 2,409,099 | Bloomfield | Oct. 8, 1946 |
| 2,541,227 | Findley | Feb. 13, 1951 |
| 2,821,271 | Sanford | Jan. 28, 1958 |

FOREIGN PATENTS

| 701,725 | Great Britain | Dec. 20, 1953 |
| 739,244 | Great Britain | Oct. 26, 1955 |